US005379596A

United States Patent [19]
Grayson

[11] Patent Number: 5,379,596
[45] Date of Patent: Jan. 10, 1995

[54] SELF-CONTAINED HAND-HELD SOLAR CHEST

[76] Inventor: Tom Grayson, 448 E. 87th St., New York, N.Y. 10128

[21] Appl. No.: 882,576

[22] Filed: May 13, 1992

[51] Int. Cl.$^6$ .............................. F25B 21/02
[52] U.S. Cl. ...................... 62/362; 62/235.1; 62/457.9
[58] Field of Search ............ 62/3.62, 235.1, 457.7, 62/457.9; 136/245

[56] References Cited

U.S. PATENT DOCUMENTS

| | | | |
|---|---|---|---|
| 3,778,312 | 12/1973 | Karius | 136/245 |
| 4,452,234 | 6/1984 | Withjack | 136/245 X |
| 4,636,579 | 1/1987 | Hanak et al. | 136/245 |
| 4,955,203 | 9/1990 | Sundhar | 136/245 X |
| 4,981,019 | 1/1991 | Hicks et al. | 62/3.62 |

FOREIGN PATENT DOCUMENTS

| | | | |
|---|---|---|---|
| 2912641 | 10/1980 | Germany | 62/235.1 |
| 2103011 | 2/1983 | United Kingdom | 136/245 |

Primary Examiner—William E. Tapolcai
Attorney, Agent, or Firm—Thomas J. Kowalski

[57] ABSTRACT

A portable, hand-held, completely self-contained, solar energy device that uses only sunlight and solar energy to power a thermoelectric or mechanical chemical cooling and heating system for the use, storage or transportation, of substances requiring temperature tempering or a temperature controlled environment in low, high and medium temperature ranges in an insulated storage chest with an accessible storage cooling or heating chamber of usable practical volume, of at least one cubic foot, with a permanently attached adjustable solar energy collector array of 3.5 square feet for the medium temperature range and 7 square feet for the low and high temperature ranges, that can be carried and operated by the average adult, child and laymen between 60 degrees global north and south latitudes, annually.

20 Claims, 9 Drawing Sheets

SELF-CONTAINED HAND-HELD SOLAR CHEST

TECHNICAL FIELD OF THE INVENTION

The present invention relates to the general and exact art and science of solar energy cooling, heating and electric generation applications and the general art and science of portable insulated thermoelectric and mechanical chemical cooling, heating and storage chests, used by the domestic, commercial, industrial and institutional sectors of the population.

BACKGROUND OF THE INVENTION

The invention described herein, and named SOLAR CHEST was first conceived of, on Jan. 19th, 1981, by the inventor. This invention construction initiated on Jul. 20th, 1985 and was completed and functioned successfully on Aug. 4th, 1991, by the inventor.

As of the date of this patent application filing this present invention is the first device in existence of its type.

The present invention is built of commercially available components and parts found in the market place.

People chill or heat, transport and store temperature controlled substances in a variety of ways using several separate devices. This present invention chills, heats, transports and stores temperature controlled substances using one lightweight, portable completely self-contained, hand-held device powered completely by solar energy. These chests are used for heating, cooling, storage and transporting any substance which requires temperature tempering or temperature controlled environments with variable outdoor or chest exterior ambient conditions.

Typically modern electric portable picnic coolers, beer chests for picnic goofs, campers, fishermen and boaters are made with built in small, miniature, cooling, heating systems and are commercially available in the market place.

Theses devices all use an external power supply either automobile 12 volt direct current or house hold 120 volt alternating current converted to 12 volt direct current which by the use of a cable attached to a standard automobile cigarette lighter and the chest or a large, heavy alternating current to direct current converter that plugs into a standard receptacle and then into chest.

The present invention has come to fruition only as recently as 1990 due to major, significant advances in technology regarding the efficiencies and performance of the thermoelectric cooling heating systems and in relation to the mechanical chemical cooling heating systems, a newly developed linear current booster.

U.S. Pat. No. 4,474,028 discloses a cooling heating system, which must rely on an external power supply in order to operate. This device requires the use of external heavy batteries which prohibit hand-held use and require external cables or wires in order to operate.

This device also depicts a remote solar energy photovoltaic array which is too large for the cooling application. This array as disclosed generates 120 watts of energy. The present invention requires only 72 watts of energy resulting in a smaller array allowing for practical transport and optimum unfolded size. This device as depicted has three separate components which must be assembled when operation of the system is desired.

The array as disclosed must be set up by the user along with cable hookups.

The array as depicted cannot be folded up for storage or transportation completely due to the piano hinges not being offset creating a bulky, awkward array too large to be transported easily by an average adult or child.

The present invention is an Improvement because it does not rely on any external power supply to operate or function and in fact is completely self-contained and can operate soley from sunlight.

This eliminates the need for any array set up or cable or wire hookup by the user. Also the present invention is Improved because it is much lighter in weight and is completely unitized.

U.S. Pat. No. 4,301,658 discloses controls systems for the operation of the thermoelectric cooling heating system yet has no specific controls required for solar energy utilization. The present invention is an Improvement because It has specific unique solar energy control systems exclusively required for solar energy utilization. Also an external cable and power supply is required for operating the system as disclosed, where as the present invention is an improvement because it does not need any external cables or power supplies but can operate with sunlight only. The present invention can operate independent of any cable or external power supply.

U.S. Pat. No. 4,981,019 discloses a device which also requires the use of heavy batteries and external cables which prohibits the device from being self-contained, lightweight, hand-held and portable. The area of photovoltaic array, as disclosed, is not sufficient to directly power a cooling heating system but can only be used to charge batteries or supply control voltages. The present invention is improved due to the fact that no external cables batteries or power supplies are required for operation and the solar energy collector array is sized to match the electrical requirements of the cooling, heating chest based on the chest's insulating characteristics and hand-held capability of the portability of the array when folded in the closed position.

U.S. Pat. No. 4,847,546 discloses a device that has been available in the market place for about three years. This device called a linear current booster, allows the solar energy photovoltaic collector and a small electric driven freon compressor, to operate without the use of heavy batteries.

This refrigeration, heat pump system permits the freezing or boiling of fluids as well as the cooling or heating of the chest's contents. This device allows the present invention to overcome the excessive current draw which is required when the compressor first starts, which is normally available from batteries. The starting of the compressor, without the need of batteries greatly reduces the chest's weight.

SUMMARY OF THE INVENTION

The present invention is comprised of a complete solar energy system which includes a solar energy collector, an energy storage system and an energy distribution system for either a cooling mode, or a heating mode. Electric generation is a third mode of operation.

Any of these three modes can be selected by the user. In addition the present invention includes a thermoelectric cooling (TEC), heating system or a mechanical and chemical cooling (MCC), nearing, system which is housed in an insulated storage container which contains a storage area for a substance that requires temperature tempering or a temperature controlled environment. The present invention also consists of a group of control and safety systems.

The present invention is a completely hand-held, self-contained, lightweight, portable, completely solar powered device which can be carried and used by a layman of the art, or an average adult or child. Also contained in the present invention are solar energy site orientation, solar energy collector array, thermal energy storage and thermal energy distribution systems along with an optional electrical power input/output function system.

A solar energy photovoltaic array, which is comprised of a various number of individual panels hinged and wired together, so they can be opened up from a compact folded state to large array permanently suspended on adjustable swing arm brackets mounted off of an insulated lightweight storage chest with a top lid which opens to encase any substance requiring temperature tempering or a temperature controlled environment by the use of thermoelectric or mechanical chemical means. The thermoelectric system is for medium energy applications such as the refrigeration or heating of foods, chemicals, films, and medicine, etc. and the mechanical chemical system is for low and high temperature applications such as making ice or boiling fluid. The thermoelectric system is based on the Peltier principal and the mechanical chemical system refers to electric driven freon compressor refrigeration and heat pump systems.

The folding collector array is of very thin aluminum construction and rejects unwanted heat gain by a fin cooling effect and it also acts as a shade creating device for the chest in the cooling mode and minimizes unwanted heat loss in the heating mode by acting as a wind blocking screen for the chest. The collector array size is determined by the optimum match of the thermal energy requirement of the chest's minimum practical usable contents volume, the minimum size permitting hand-held operation of the chest and the energy requirements of the cooling heating systems as well as the chest's insulating characteristics. The collector array must be Just the right size in order to both power the system and be folded to an easily portable size. The array must be permanently attached to the chest and when the panels are folded closed during nonuse they must always be separated to prevent the absorber surfaces from touching each other by way of a mechanical stop and must be clasped shut with a locking device to prevent movement of the panels or their bouncing around during transport. The array must provide unrestricted use of the opening of the chest lid during use or nonuse by swinging out of the way when the lid is either opened or shut.

The present invention also includes an optional built in automatic array tracking system in two planes allowing the array to remain perpendicular to the sun at all times by the use of two direct current motors mounted on the extended panel brackets.

The array tracking system operates by moving the array constantly by two direct current motors, one motor for each of the vertical and horizontal planes with clock speeds predetermined by gears and cams.

The present invention has a site orientation system consisting of a small flush recessed mounted removable hand-held magnetic compass mounted in the chest for determining magnetic south with a sliding bezel ring to position and indicate predetermined local magnetic deviation along with sun azimuth indicating device to position the solar collector array in it's optimum fixed position and includes two liquid level indicators installed in the chest to determine both the collector array and the chest horizontal levelness and vertical plumbness. The present invention includes height adjustable legs creating an air space below the chest for allowing convective air movement in cooling mode and an array and chest level and plumb compensation system. The present invention also includes a mirror reflective, mylar film which is attached to the backside of the last exposed array panel when when the array is folded in the closed position which prevents unwanted heat gain to the photovoltaic cells and this film is also covering the insulated chests six outer surfaces so that when the chest is not being used, yet is left exposed in direct sunlight, unnecessary heat gain does not occur and the emissivity value is low minimizing heat loss in the heating mode.

Also the present invention includes a separate black canvas insulated slip over cover for the chest which can be used in cold climates when in the heating mode to prevent unwanted heat loss and to act as a solar energy collector absorber, to augment solar gain, and with the reversible side's mylar mirror surface, reduce unwanted heat gain in the cooling mode.

In addition a global solar insolation map, with a collector azimuth latitude inclination chart along with a numerical indicator displaying predetermined local magnetic deviation are used to optimize the position and use of the collector array. These are mounted on the surface of the chest. Also the chest has a lip surrounding the lid to prevent rain from entering the chest and to prevent wind infiltration to the chest.

In addition to the cooling and heating modes the present invention contains optional electrical power input output power functions for applying auxiliary energy input for cooling or heating when solar energy is insufficient to power the device and for powering small appliances such as radios, televisions and battery charging that use 3, 6, 9 or 12 volts of direct current including 120 volts alternating current when cooling or heating modes are not being used. Included in the present invention is the use of appliance plug adapter kits and foreign input voltage adapters. These kits and adapters are used to allow numerous small appliance power supply plugs of different size, shape, pin configuration and voltage levels to be adaptable to the present invention electrical input and output Jack and plug connection requirements.

The following are the safety systems that are used during the operation of the present invention:
Photovoltaic panel electrical output short circuit protection.
Photovoltaic excessive current draw protection.
Panel physical anti-vibration protection for transport or storage.
Panel anti-solar heat gain shield.
TEC generator low temperature limit.
MCC generator low temperature limit.
TEC generator high temperature limit.
MCC generator high temperature limit.
MCC compressor high head.
MCC compressor low head.
MCC condenser high temperature limit.
MCC evaporator low temperature limit.
External power input excessive voltage protection.

External power input reverse voltage protection.
External power output excessive current draw.
External power output reverse voltage protection.
Light warning indicators.
Line voltage spike and surge protection.

The following are the control systems that are used in the operation of the present invention:

Adjustable solar energy collector panel azimuth inclination.
Inclination indicator.
Orientation indicator.
Horizontal position indicator.
Vertical position indicator.
Cooling heating mode selector.
Sunlight chest and array reflective shield.
Array shade screen
Array wind block screen
Adjustable legs.
Chest ambient temperature low temperature limit.
Chest ambient temperature high temperature limit.
Power input selector.
Power output selector.
MCC Linear current booster.
MCC high and low temperature selector.
Chest canvas slip on mylar reflective, absorber cover.
Photovoltaic umbrella augmentation.

The following is a description of the operation of the solar chest for medium temperature ranges for applications such as the refrigeration of food.

The example sited is for an average condition.

This condition is the average worse condition when the system components are at their lowest efficiencies.

All of the following description is of convention and is adopted from American industry practices and standards, i.e. The American Society of Heating, Refrigeration and Airconditioning Engineers, (A.S.H.R.A.E.).

The following is a list of abbreviations used to describe the operation of the present invention:

| | |
|---|---|
| British thermal unit | BTU |
| British thermal units | BTUS |
| Chest contents volume | CV |
| Chest exterior outside ambient temperature | OA |
| Chest exterior surface area | CSA |
| Chest heat exchanger efficiency | CHE |
| Chest heat loss | CHL |
| Chest insulating conductance | U |
| Chest insulating resistance | R |
| Chest interior ambient temperature | IA |
| Chest volume mass | CVM |
| Collector panel efficiency | CPE |
| Collector panel area | CPA |
| Gallon | GAL |
| Gallons | GALS |
| Hour | HR |
| Hours | HR |
| Inch | IN |
| Light emitting diode | LED |
| Miles per hour | MPH |
| Pounds | LBS |
| Solar energy system input | SEI |
| Solar energy insolation | SI |
| Square feet | SF |
| Square foot | SF |
| Thermoelectric cooler | TEC |
| Thermoelectric cooling efficiency | TCE |
| Wind speed | WS |

The present invention works as follows:

The solar energy input to the system must be equal to or greater than the energy required to overcome the heat gain of the contents of the chest. This includes the inefficiencies of the photovoltaic cells, the inefficiencies of the thermoelectric cooling system and the loss of energy from the heat transfer process between the chest's contents and the compartment's heat exchanger.

Where
$CV = 1$ CUFT
$CVM = 8.33$ LBS/GAL/BTU/HR/DEG F
$OA = 90$ DEG F
$IA = 50$ DEG F
$TD = OA - IA$
$R = 7$ BTUS/IN/HR/DEG F/SQFT
$CSA = 6$ SQFT
$SI = 250$ BTUS/HR/SQFT
$CPA = 3.5$ SQFT
$CPE = 8\%$ @ 90 DEG $F = OA$
$TCE = 63\%$
$CHE = 50\%$
$U = 1/(R \times 1.5)$ ($1\frac{1}{2}$IN insulation)
$WS = 0$ MPH and in a steady state where thermal mass energy input = thermal mass energy output, $TMI = TMO$.

$$SI \times CPA \times CPE \times TCE \times CHE = SEI = TMI$$
$$250 \text{ BTUS/HR/SQFT} \times 3.5 \text{ SQFT} \times .08 \times .63 \times .50 =$$
$$22 \text{ BTUS/HR} =$$
$$U \times CSA \times TD = CHL = TMO$$
$$1/10.8 \text{ BTUS/IN/DEG F/SQFT} \times 6 \text{ SQFT} \times 40 \text{ DT} =$$
$$22 \text{ BTUS/HR}$$

The above example is a conservative explanation of the criterion of the thermoelectric cooling mode only.

OBJECTS OF THE INVENTION

It is a main objective of the present invention to provide cold thermal energy from sunlight for cooling or storing of substances, of a minimum usable practical volume, one cubic foot, i.e. food for one to two days for a family or group of two to six people in an insulated portable chest which is completely self-contained hand-held and lightweight, fully, soley, solar powered packaged system which can be carried and operated easily, without confusion by most adults and children.

It is another object of the present invention to provide hot thermal energy from sunlight for heating or storing of substances, of a minimum usable practical volume, one cubic foot i.e. food for one or two days for a family or group of two to six people, in an insulated portable chest which is completely self-contained, hand-held and lightweight, fully, soley, solar powered packaged system which can be carried and operated easily, without confusion and carried by most adults and children.

It is another object of the present invention to convert solar energy to thermal energy for boiling or freezing of fluids with a completely hand-held, portable, self-contained soley solar powered device.

It is another object of the present invention to allow auxiliary electrical energy to be externally available from a variety of sources with standard, universal, global or international adaptability of the plugs and cables.

It is another object of the invention to provide electrical power for use of small appliances that consume direct and alternating currents and the charging of reusable direct current batteries and that this electricity is generated from sunlight.

BRIEF DESCRIPTION OF THE DRAWING FIGURES

DETAILED DESCRIPTION OF THE PREFERRED EMBODIMENT OF THE INVENTION

Figure 1:
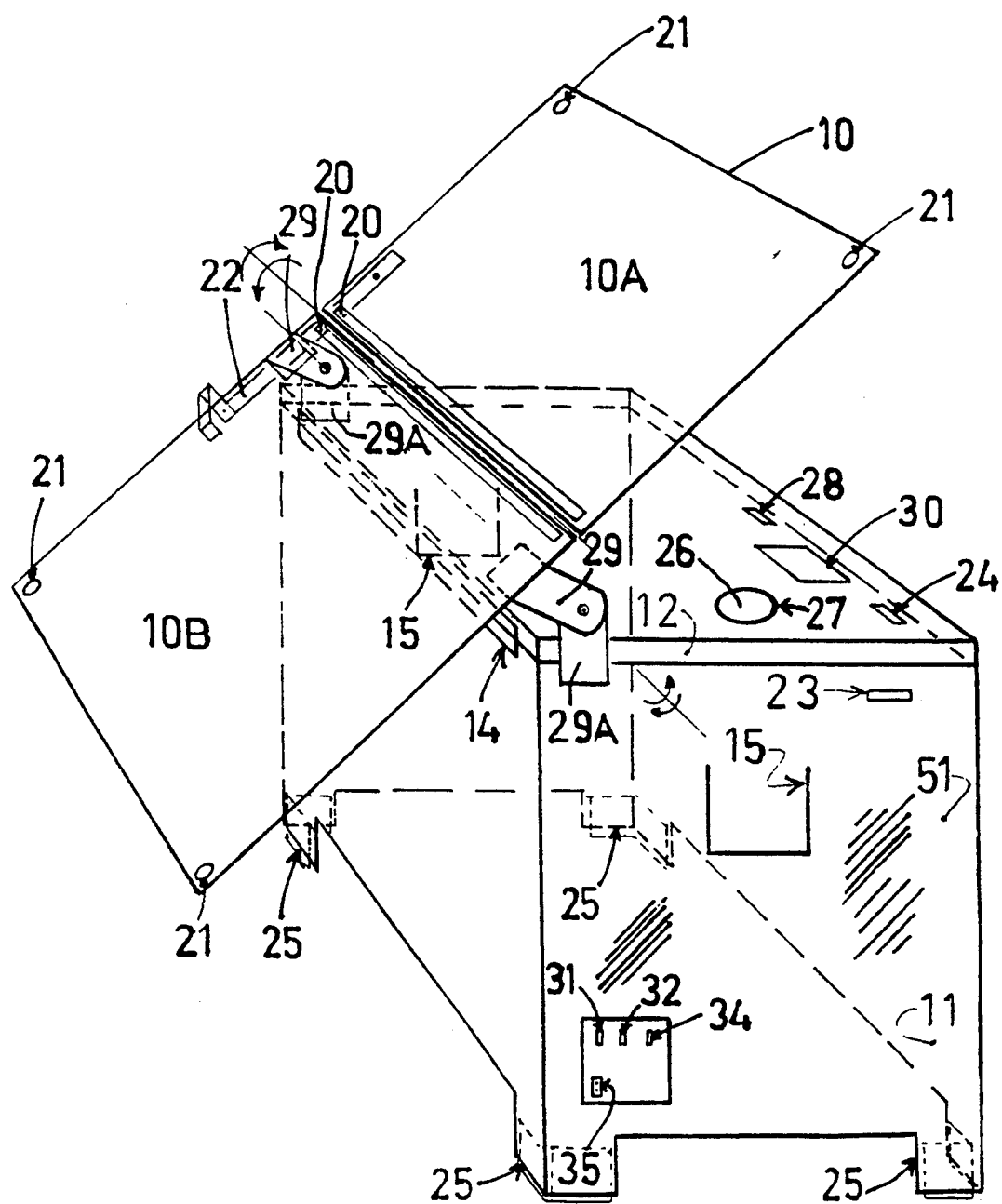
FIG. 1 is a perspective view of the present invention, the thermoelectric cooler heater solar chest in an operating mode.

Shown in FIG. 1 is a portable, hand-held, self-contained, solar energy cooling, heating and insulated, storage chest consisting of an adjustable, solar energy photovoltaic collector array panel 10, consisting of two singular panels 10a and 10b, permanently attached to a thermoelectric, cooling, heating and insulated storage chest 11, that has a lid 12, which can be carried by the two handles 15, embodying the present invention. In addition, FIG. 1 and 1a depict the present invention In the operating mode.

Figure 2:
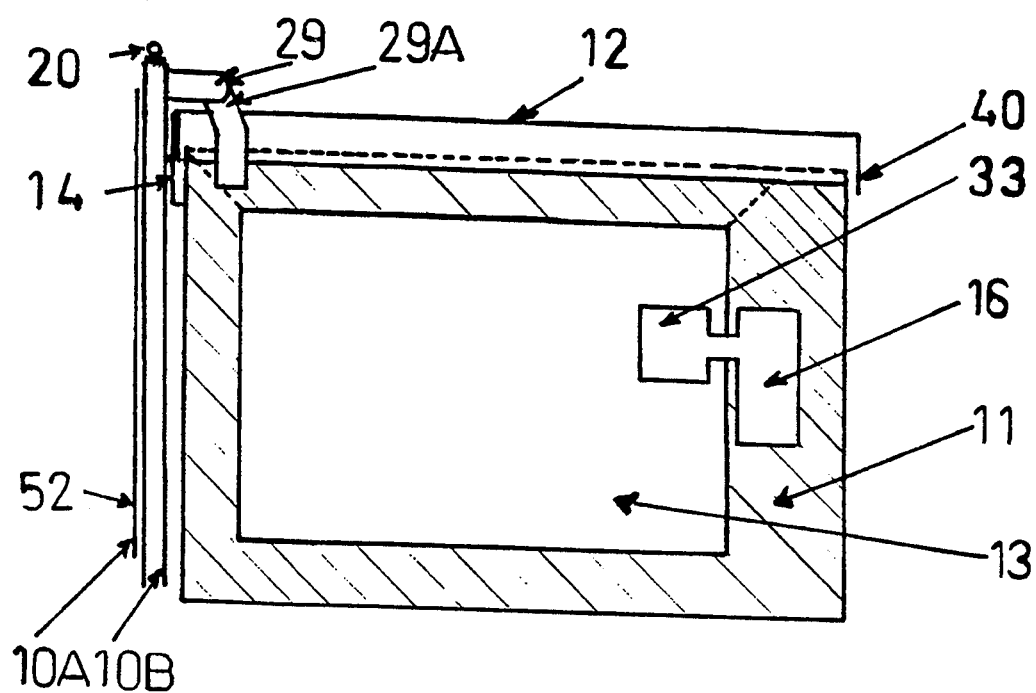
FIG. 2 is a schematic side view diagram of the present invention of the thermoelectric cooler heater solar chest, with the solar collector array in a closed position.
Figure 2A:
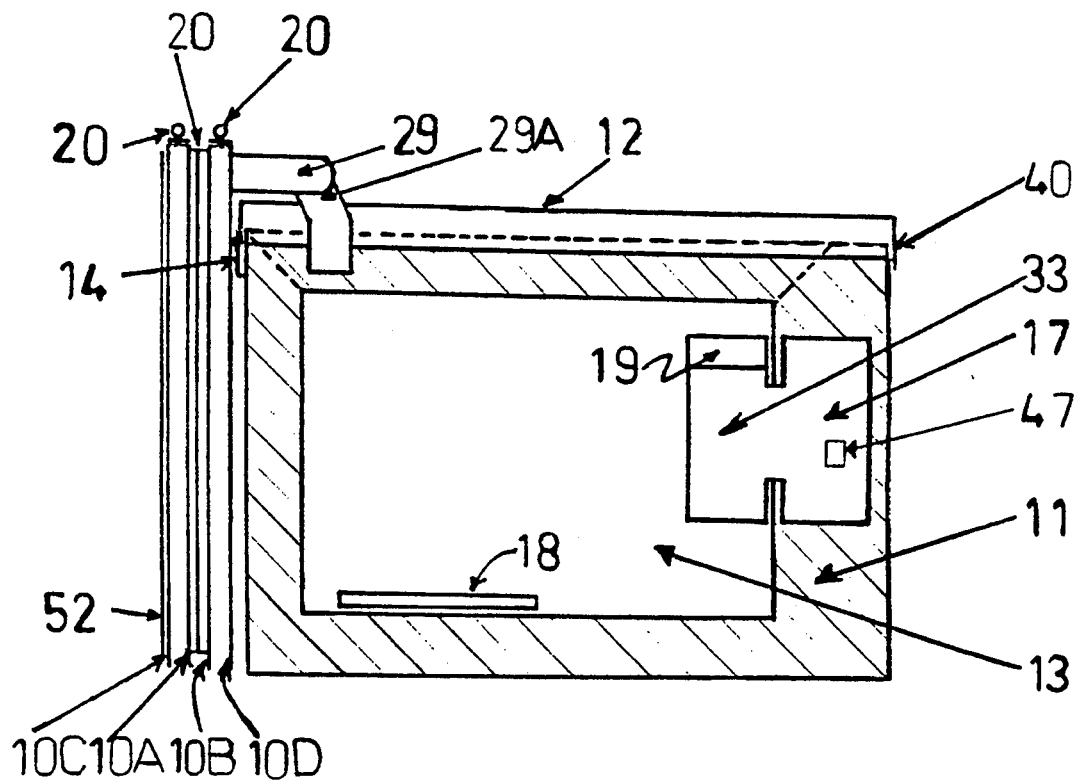
FIG. 2a is a schematic side view diagram of the present invention of the mechanical chemical cooler heater solar chest, with the solar collector array in a closed position.

Shown in FIGS. 2 and 2a, the chest 11 has a storage compartment 13 and by the use of hinge 14, allows lid 12 to open and close. The lip 40 surrounds the chest lid 12 and prevents water or air infiltration to the storage compartment.

Figure 1A:
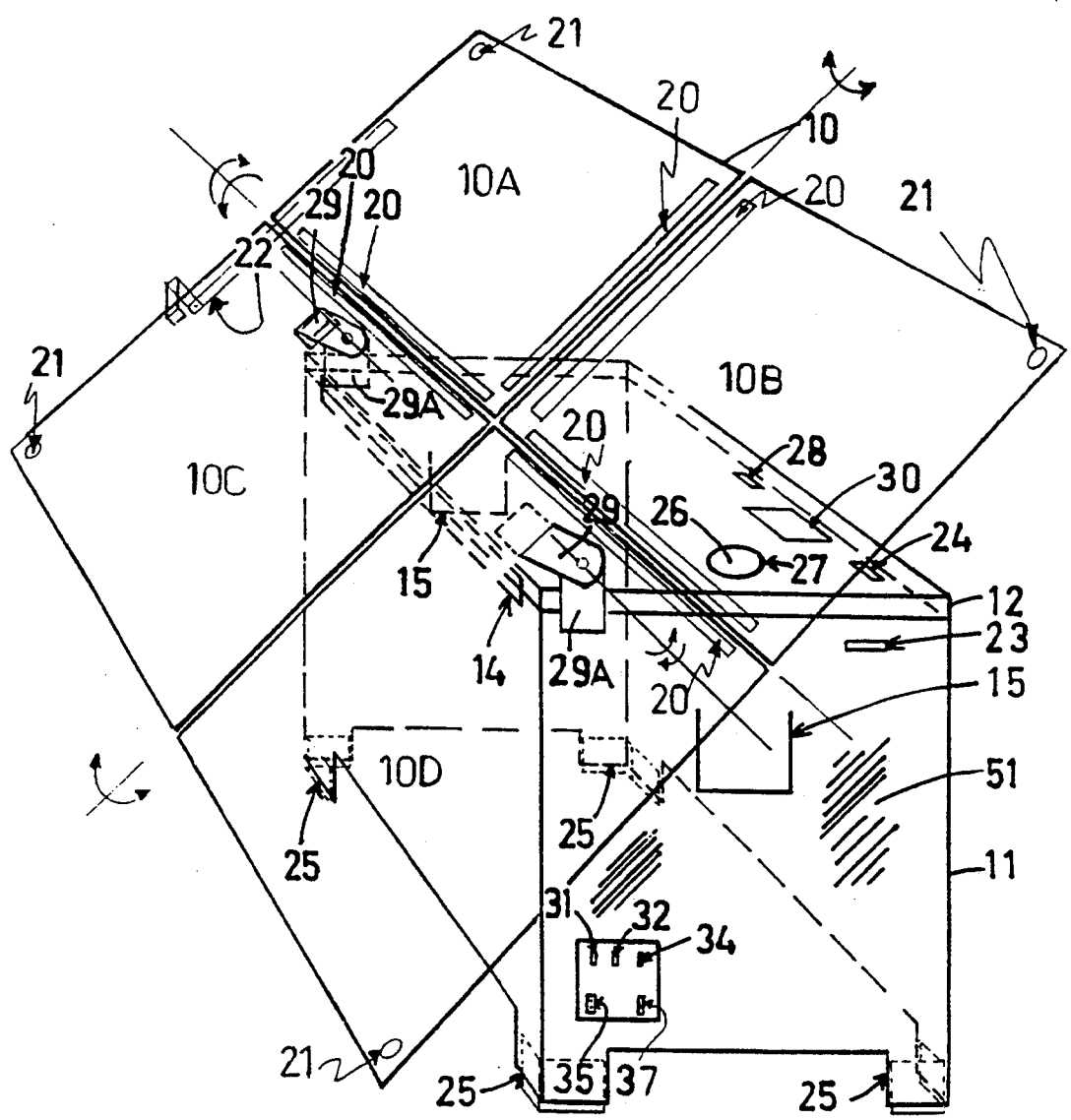
FIG. 1a is a perspective view of the present invention, the mechanical chemical cooler heater solar chest in an operating mode.

Shown in FIG. 1a is a portable, hand-held, self contained, solar energy cooling, heating and insulated storage chest consisting of an adjustable solar energy photovoltaic collector array panel 10, consisting of four singular panels 10a thru 10d, permanently attached to a mechanical, chemical, cooling, heating and insulated storage chest 11, that has a lid 12, which can be carried by the two handles 15, embodying the present invention.

FIG. 2, shows an insulated storage chest 11 and solar energy, collector array 10, and a medium temperature service thermoelectric cooling heating system 16, embedded in the body of the storage chest 11. FIG. 2a, shows an insulated storage chest 11, and solar energy, collector array panel 10, and a low and high temperature mechanical chemical cooling heating system 17, which has an electric driven freon compressor embedded in the body of the storage chest 11, as well as a linear current booster 47 which allows the compressor to draw current from the solar photovoltaic collector array 10. In addition an electric resistance hot plate 18, for boiling fluids and an ice/freezing compartment 19 are shown in FIG. 2a.

FIGS. 2, and 2a, show the solar collector array panel 10, folded and latched in the closed position when the unit is not powered by the sun, is not being used or is being transported. This is done by the use of the offset butt hinges 20, the bumpers 21, and the panel stabilizing bars, and panel latch 22 shown in FIG. 1 and 1a. Also, FIG. 1 and 1a show a mirror or chrome finish 51, to all six outer surfaces of the solar chest to prevent unwanted heat gain in the cooling mode and to minimize the solar chest's outer surface emissivity.

The outer most singular panel 10a shown in FIG. 2 or panel 10c, shown in FIG. 2a, that is exposed to sunlight when array is folded closed, has an anti-heat gain reflective mylar film 52, attached to the exposed surface of the backside of said panel to prevent damage to the collector array by preventing this panel from absorbing sunlight causing heat damage.

In order to operate the solar chest, in either the cooling, heating or electric generation modes two methods can be used. The user can simply open up the collector panel and face it towards the sun for the first method or for the second method a solar energy enthusiast can accurately orient the solar chest to optimize the collection of solar energy by the use of maps, a chart, compass, and level and plumb indicators.

The solar chest is positioned on a any surface exposed to direct sunlight and is placed in a level and plumb position by the use of the two liquid level bubble indicators 23 and 24 as shown in FIG. 1 and 1a and if necessary any one or more of the four height adjustable legs 25 can be raised or lowered to compensate for the chests levelness and or plumbness. In addition the solar chest is positioned so that the array is perpendicular to true solar south as shown in FIG. 1 and 1a, by the use of the compass 26 and the sliding bezel ring 27, indicating the local magnetic deviation which is added or subtracted to the south compass reading after being determined from standard marine or aviation charts and temporarily recorded on a digital indicator 28.

Then the array is unlatched and opened up so that the individual panels are positioned in the same plane and are locked in this position with the panel stabilizing bar and latch 22, shown in FIG. 1 and 1a.

Figure 3:
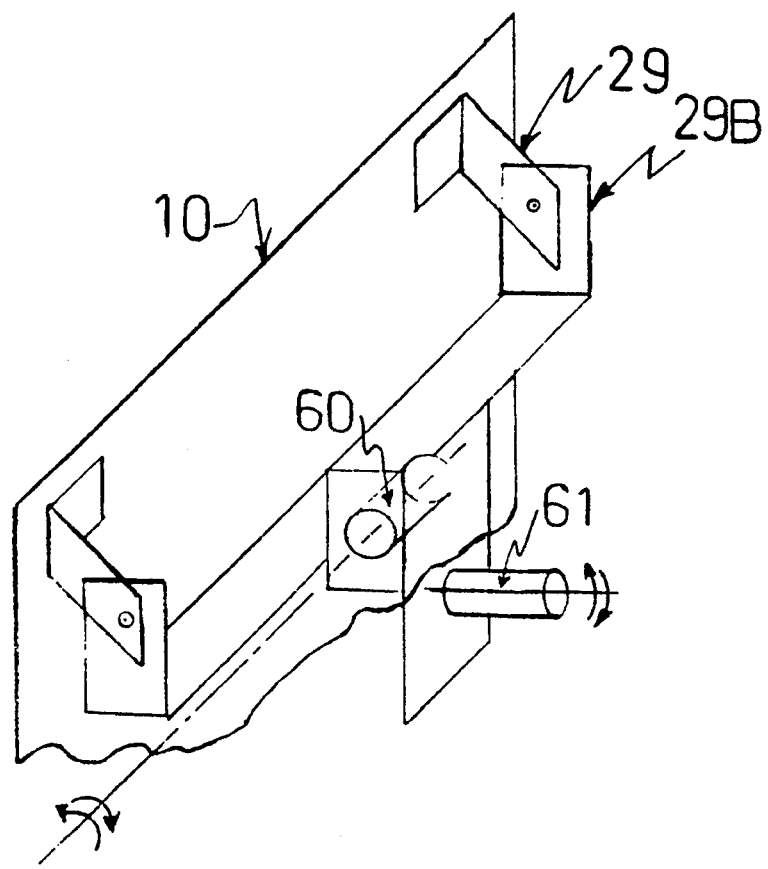
FIG. 3 is a schematic perspective illustration of the present invention with an optional sun array tracking bracket and two tracking motors.
Figure 3A:
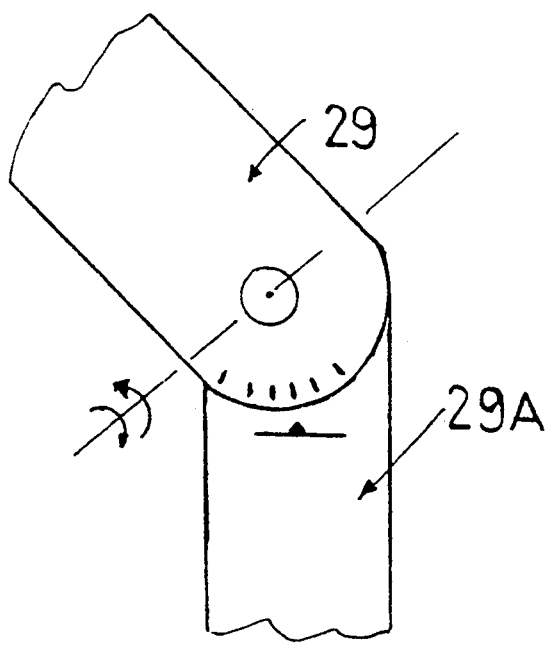
FIG. 3a is a diagram of the detail of the solar chest array brackets showing the array angle of inclination graduated markings.

As FIG. 1 and 1a show, the entire array is then swiveled on the chest brackets 29 and 29a with the panels perpendicular to the sun as determined by chart 30, to obtain optimum angle of inclination which is indicated by the graduated marks shown in FIG. 3a located on chest bracket 29 and 29a.

FIG. 3 shows a swiveling bracket assembly 29b with two direct current motors 60 and 61, mounted with a geared drive and cam to move the solar collector array panel 10, perpendicular to the sun with a rate of speed equal to standard clock time. This automatic tracking system is an optional feature which requires substitution of bracket 29b, with brackets 29a shown in FIGS. 1 thru 3.

FIG. 1 and 1a show switch 31 positioned to solar photovoltaic panel input.

The photovoltaic array generates 12 volts direct current at three amps current which is enough to power the thermoelectric cooler heater or in the case of the mechanical chemical cooler heater, 12 volts direct current at six amps.

FIG. 1, and 1a show switch 32 positioned to select either the cooling or heating mode and then the chest interior heat exchanger 33 shown in FIGS. 2 and 2a starts to become cool or warm. Any substance requiring temperature tempering is placed inside the storage compartment 13 shown in FIGS. 2 and 2a.

In addition ether alcohol storage packs or ice can be can be added to the compartment 13 to act as a thermal storage medium for the cooling mode and alcohol packs can be added to the compartment for the heating mode.

In order to freeze water, some other fluid or create a very cold interior temperature, FIG. 1a shows switch 37 is positioned to run a compressor constant or in the case of boiling a fluid, activate the electrical resistance hot plate 18 shown in FIG. 2a.

When the solar chest is being used with axillary power, the solar collector panels 10a and 10b or 10a–10c are folded closed as shown in FIG. 2 and 2a and switch 31 is positioned to auxiliary input. Jack 35 shown in FIG. 1 and 1a and cable 36 shown in FIG. 6 are used to connect the solar chest to an external power supply. This is done as shown in FIG. 6, by either a standard automobile cigarette lighter plug 38, some other 12 volt direct current source or with the use of a standard American, 120 volt alternating, to 12 volt direct current converter 44, or with the use of foreign or European domestic voltage adapter 41, or a 220 volt alternating to 12 volt direct current converter 45 that all connect to jack through cable 36.

In the event electric current generation is selected instead of solar cooling or heating then switch 34 can be positioned to allow the photovoltaic panel to direct voltage to Jack 35 shown in FIGS. 1 and 1a, conducting current to either a direct current application, to power external devices such as a small radio or tape recorder, the charging of automobile or other batteries or to direct current to alternating current converters allowing the user to power a small television or fan or other 120 volt alternating current device. FIG. 6 shows a 12 volt direct current to 120 volt alternating current inverter 42 and a 12 volt current to 220 volt alternating current inverter 43 that can be used to power small appliances such as televisions, fans, radios, etc.

When electric current generation mode is selected jack 35 shown in FIGS. 1 and 1a, is used with plugs shown in FIG. 6. Plug 38 can be used for auxiliary power input connections or to charge a 12 volt car battery and plugs 46 thru 46b can be used to supply voltages for 3, 6 and 9 volt direct current applications, respectively.

Figure 4:
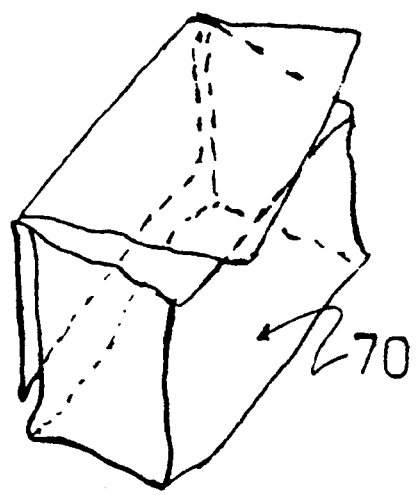
FIG. 4 is a perspective illustration of an insulated fabric slip over chest cover.

The fabric cover 70 shown in FIG. 4 can be used to increase insulating and anti-heat gain or loss conditions improving the operation of the solar chest by placing over the deployed chest.

Figure 5:
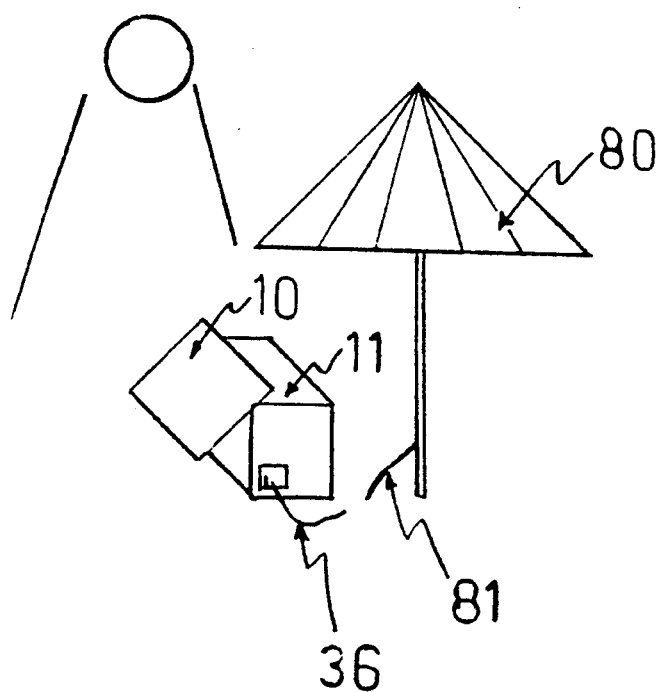
FIG. 5 is a schematic diagram that shows a photovoltaic umbrella to augment the solar chest use.
Figure 6A:
FIG. 6 is a schematic diagram that shows various optional electrical cables and plugs.
Figure 6F:
Figure 6B:
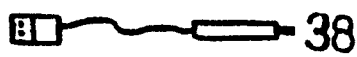
Figure 6G:
Figure 6C:
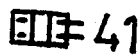
Figure 6D:
Figure 6H:
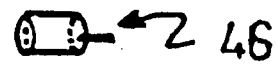
Figure 6E:
Figure 6I:
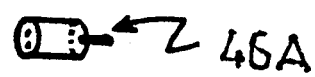
Figure 6J:
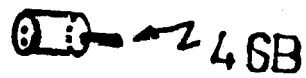

The umbrella 80 shown in FIG. 5 can be deployed to enhance the operation of the solar chest in the cooling mode by creating additional shading of the solar chest 11, leaving the solar collector panels 10, exposed to direct sunlight with the chest placed in the shade that the umbrella creates along with the additional direct current electricity that the photovoltaic panels attached to outer surface of the top side of the umbrella generate and supply to the solar chest 11 by cable 36 and cable 81.

All of the safety and control systems disclosed in this patent submission are all necessary for the proper operation of the solar chest and are located throughout the unit.

I claim:

1. A portable container comprising:
a chest including,
   a bottom,
   a plurality of side walls, and
   an openable top wall;
   said bottom and plurality of side walls connected to each other to form an open-topped compartment and, said top wall openably-connected to at least one side wall so that the top wall closes the compartment but also opens up the compartment and allows access to the compartment;
a temperature control system including,
   a cooling or heating system embedded in a side wall of the chest, and
   a heat exchanger connected to said cooling or heating system and positioned within the compartment; and,
a power source including,
   a photovoltaic collector array panel comprised of at least two foldable panels connected to the temperature control system and, attached to the chest at at least one wall by means for attaching the panel to the chest which allow the at least two connected foldable panels to swing, as one unit, from 90 degrees perpendicular to the horizon up to 180 degrees parallel to the horizon, to allow a user to position the photovoltaic collector array panel; said photovoltaic collector array panel being separate from the walls of the chest and positioned over at least a portion of the chest; and, said photovoltaic collector array panel is of a size sufficient to power the temperature control system without reliance upon batteries or an external power source when placed in sufficient light.

2. The container of claim 1 wherein:
the photovoltaic collector array panel is comprised of at least two connected foldable panels, and is movably connected to two substantially parallel side walls.

3. The container of claim 1 wherein:
the temperature control system is comprised of
   a cooling and heating system embedded in a side wall of the chest, and
   the heat exchanger connected to the cooling and heating system positioned within the compartment.

4. The container of claim 1 wherein:
the temperature control system is comprised of
   a cooling and heating system embedded in a side wall of the chest, and
   the heat exchanger connected to the cooling and heating system positioned within the compartment; and
the photovoltaic collector array panel is movably connected to two substantially parallel side walls.

5. The container of claim 4 wherein the cooling and heating system is a thermoelectric cooling heating system and the photovoltaic collector array panel is at least 3.5 square feet.

6. The container of claim 4 wherein the cooling and heating system is a mechanical and chemical cooling system and the photovoltaic collector array panel is at least 7 square feet.

7. The container of claim 4 wherein the plurality of side walls comprises a front wall, a back wall, a right side wall and a left side wall; and the top wall is hingedly connected to the back wall.

8. The container as claimed in claim 4 wherein the photovoltaic collector array panel has a backside and is attached to the chest by at least two stationary brackets each of which is attached to one of the two substantially parallel side walls of the chest and at least two pivoting brackets both of which are attached to the backside of the photovoltaic collector array panel to allow the at least two connected foldable panels to swing, as one unit, from 90 degrees perpendicular to the horizon up to 180 degrees parallel to the horizon, to allow a user to position the photovoltaic collector array panel.

9. The container as claimed in claim 8 wherein the pivoting brackets have graduated indicating marks and there is an indicating mark located on each of the stationary brackets to allow photovoltaic collector array panel alignment of solar azimuth to a predetermined angle.

10. The container as claimed in claim 4 wherein the at least two connected foldable panels are connected by offset hinges attaching the foldable panels together and means for isolating absorbing surfaces of the foldable panels from touching each other when folded which includes corner bumpers and means for securing the folded foldable panels together for transport or nonuse.

11. The container as claimed in claim 4 which includes an orientation system comprising a removable hand-held magnetic compass mounted in a recess in the chest top wall, a digital indicator attached to the chest to temporarily record and show predetermined local magnetic deviation, and a chart for determining photovoltaic collector array panel inclination.

12. The container as claimed in claim 11 wherein the chest includes a plurality of adjustable legs mounted to the bottom and two visual liquid level sight tubes each mounted in a wall of the chest and, said walls having the sight tubes being substantially perpendicular to each other.

13. The container as claimed in claim 4 wherein the chest top wall includes an overhanging lip.

14. The container as claimed in claim 4 wherein outer surfaces of the chest are reflective.

15. The container as claimed in claim 4 which includes a waterproof, flexible fabric, removable, slip over chest cover that is reversible and thus has two surfaces wherein, one surface is a reflective surface and the second surface is a flat black surface.

16. The container as claimed in claim 4 wherein the power source additionally includes means for an auxiliary input power supply.

17. The container as claimed in claim 4 wherein the power source additionally includes means for selectable output power.

18. The container as claimed in claim 8 additionally including a two axis collector panel sun tracking system comprising two direct current motors, one for each of the horizontal and vertical planes that are mounted on the pivoting brackets and are geared and cammed to move at a speed equal to standard clock speed so as to position the photovoltaic collector array panel perpendicular to the sun.

19. The combination as defined in claim 1 which also includes an optional shading and power generating umbrella which is to augment the operation of the solar chest use.

20. The container as claimed in claim 6 wherein the temperature control system includes an interior ice making and storage compartment inside the compartment of the chest and connected to the heat exchanger; and an interior hot plate inside the compartment of the chest.

* * * * *